US005620242A

United States Patent [19]
Leon et al.

[11] Patent Number: 5,620,242
[45] Date of Patent: *Apr. 15, 1997

[54] PORTABLE RADIO BATTERY LATCH

[75] Inventors: Robert Leon, Miami Lakes; Kok H. Chong, Tamarac; Kuruvilla Valakuzhy, Plantation, all of Fla.

[73] Assignee: Motorola, Inc., Schaumburg, Ill.

[ * ] Notice: The term of this patent shall not extend beyond the expiration date of Pat. No. 5,460,906.

[21] Appl. No.: 49,050

[22] Filed: Apr. 19, 1993

[51] Int. Cl.⁶ .................................................. H01R 3/00
[52] U.S. Cl. ................... 312/223.1; 312/319.1; 292/175; 439/500
[58] Field of Search .............................. 312/223.1, 319.1, 312/111; 292/128, DIG. 37, DIG. 38, 175, 164; 439/500, 928, 928.1

[56] References Cited

U.S. PATENT DOCUMENTS 2,571,353 10/1951 Felsch .
4,239,269 12/1980 Chiang ..................................... 292/175
4,363,403 12/1982 Raucci, Jr. et al. .
4,714,439 12/1987 Marabotto et al. ...................... 439/627
4,746,008 5/1988 Heverly et al. ............. 292/DIG. 38 X
5,160,879 11/1992 Tortola et al. ............................ 320/2
5,306,172 4/1994 Inada et al. .
5,348,356 9/1994 Moulton ..................... 292/DIG. 38 X
5,460,906 10/1995 Leon et al. .

FOREIGN PATENT DOCUMENTS 22494 10/1909 United Kingdom ................... 292/175

*Primary Examiner*—Peter M. Cuomo
*Assistant Examiner*—Hanh V. Tran

[57] ABSTRACT

A latch (202) for a battery (10) includes a beam (2) supported at opposite springing (418) ends (8). A protrusion (52) located between the opposite ends of the beam selectively latches onto a fixed hook (152).

3 Claims, 3 Drawing Sheets

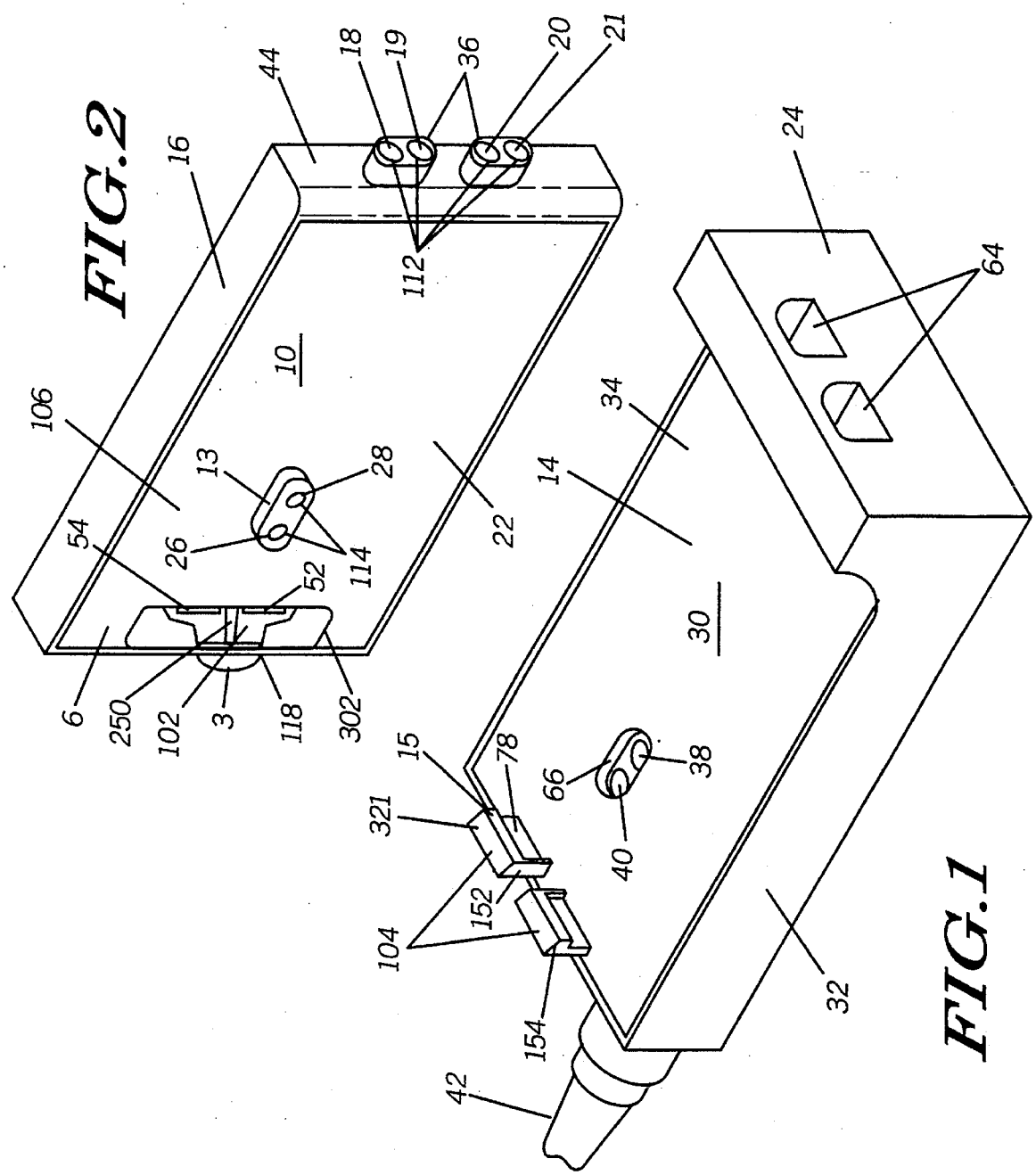

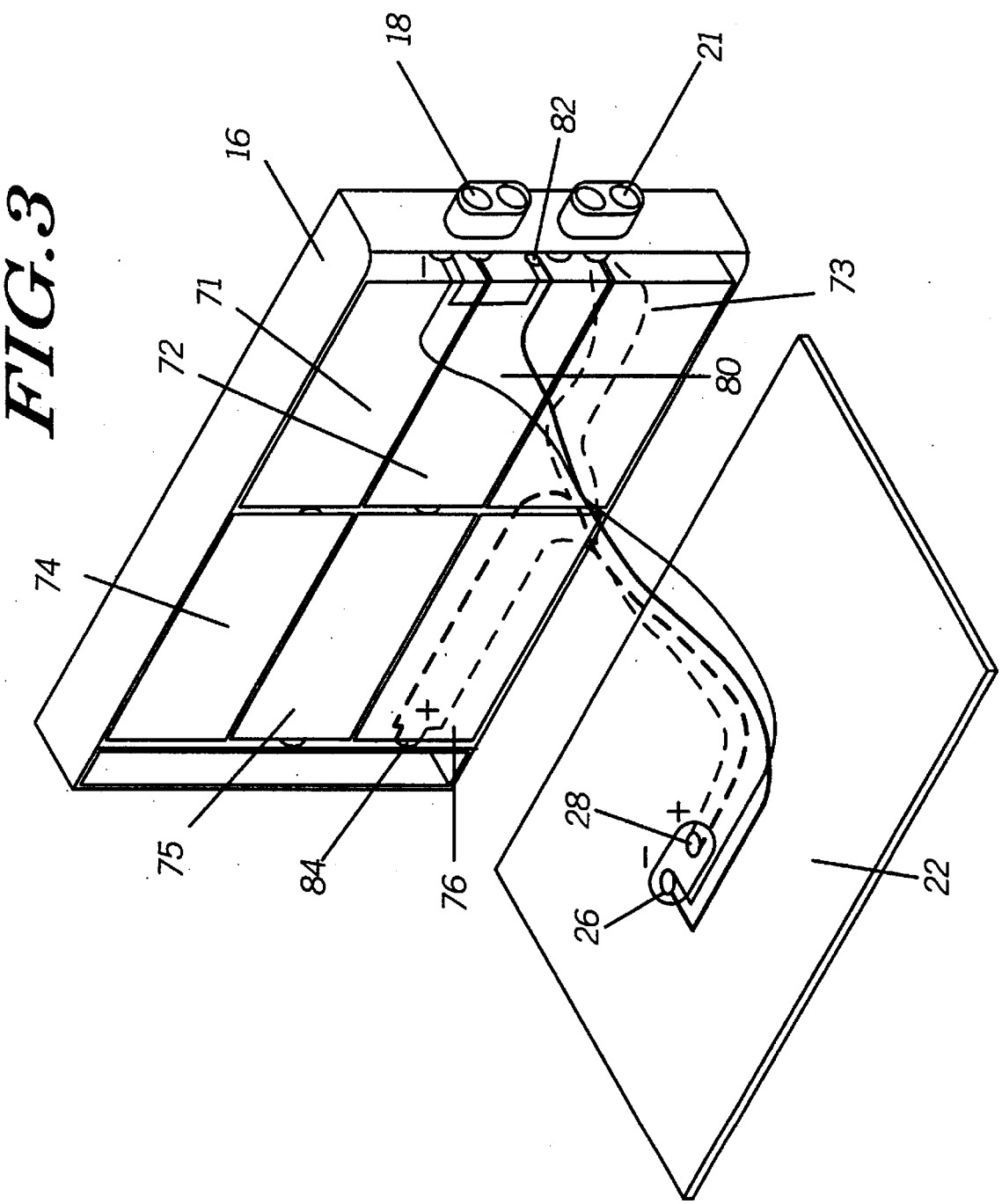

PORTABLE RADIO BATTERY LATCH

TECHNICAL FIELD

This invention relates generally to portable radio batteries, and more specifically to latches for radio batteries.

BACKGROUND

Portable radios must be designed so that the batteries do not easily come off. However, ease of removal and insertion of a battery pack onto a radio is a desirable feature. Accordingly, a need exists for a latch that facilitates insertion of the battery pack onto and removal from the radio housing, while providing protection against accidental removal.

SUMMARY OF THE INVENTION

Briefly, according to the invention, a latch for a battery includes a beam supported at opposite springing ends. A protrusion located between the opposite ends of the beam selectively latches onto a fixed hook.

BRIEF DESCRIPTION OF THE DRAWINGS

FIG. 1 is a perspective rear view of a radio in accordance with the present invention.

FIG. 2, is a perspective rear view of a battery pack in accordance with the present invention.

FIG. 3 is bottom view of the latch assembly 102 of FIG. 2.

DETAILED DESCRIPTION OF THE PREFERRED EMBODIMENT

Figure 4:
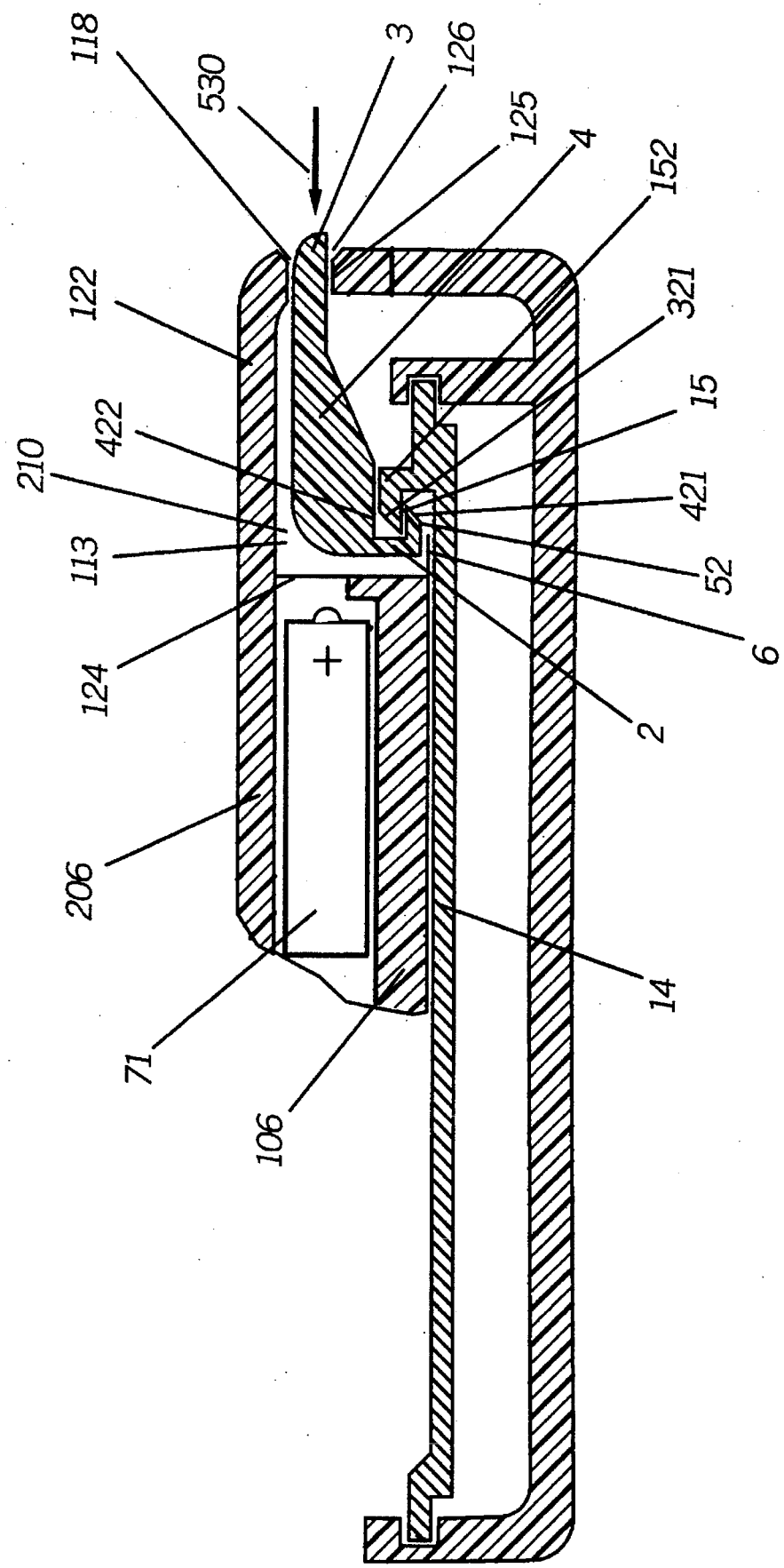
FIG. 4 is a sectional view of a simplified latch 52 and catch 152 assembly of the radio of FIG. 1 and the battery of FIG. 2.

Referring to FIG. 1, a battery (or other energy source) or battery pack 10 selectively attaches to and powers a communication device, such as a two-way radio 30. Radio 30 includes a radio housing 32 having a battery receiving area 34 on the backside 14 of the radio housing and an antenna 42. The receiving area 34 also includes a bottom sidewall 24 that extends perpendicularly away from the backside 14 of the housing 32. Within the battery receiving area 34, the radio 30 has retainable receiving areas, such as a cavity 66 located on the backside 14 and a pair of apertures 64, located on the bottom sidewall 24 to form a retainer, for mechanically coupling the battery 10 to the radio 30. Conductive mating means, such as positive and negative radio supply contacts 38 and 40, respectively are recessed within the cavity 66, but show through corresponding apertures, to form a protrusion receiving area or socket. The bottom apertures 64 and the top cavity 66 are used for receiving the battery 10. These retainers simultaneously serve three functions: mechanically coupling the battery 10 to the radio 30, electronically coupling the battery to the radio through the radio contacts 40 and 38, and providing accessibility to the battery for a charger (not shown) through the apertures 64 when charging the battery.

The radio housing 32 and its backside 14 can either be two separate housings coupled together or one integrated housing. Preferably, the backside of the radio housing is a separate metal chassis for providing ground protection to the radio while both the housings for the battery and radio are made from plastic.

For latching of the battery to the radio, a catch assembly 104 is mounted on a top center end of the radio's backside or chassis 14. The catch assembly 104 includes two fixed hooks 152 and 154, each having a protrusion or upper ledge 15. Each of the upper ledge 15 has a sloping top surface 321 and the interior wall of the fixed hook defines a recess 78.

Referring to FIG. 2, a battery housing 16 includes a bottom side or underside 44 and a housing portion or battery cover 22 on the rear or backside. Both the battery cover 22 and the bottom side 44 of the battery housing include mating mechanisms, such as protrusions or bosses 13 and 36, respectively, for attaching the battery to the radio 30. The bottom protrusions 36 captivate charging contacts such as positive and negative charger contacts 18 and 21 and sensor contacts 19 and 20 on the bottom side 44 of the battery pack 10. Likewise, on the rear or backside of the battery pack 10, the top protrusion 13 captivates the positive and negative supply contacts 28 and 26, respectively, within the top rear protrusion 13 disposed on the housing portion or battery cover 22.

Each bottom protrusion 36 hooks into the aperture 64, in the corresponding end of the radio housing 32 to provide pivotal support. Similarly, the top rear protrusion 13 extends into the cavity 66, in the corresponding top portion of the radio housing 32, to provide proper alignment and to reduce tolerance stack-up during attachment. When the lower end of the battery is inserted into the radio, the battery pack 10 hooks or pivots at one end as the lower protrusions 36 are engaged by the apertures 64. Preferably, the protrusions 36 do not extend out of the apertures 64 but are recessed within them. Then, the protrusion 13 in the battery cover is pivoted into proper alignment by being lowered towards the radio housing until the protrusion 13 aligns into place. Thus, the protrusion 13 and cavity 66, mated at the opposite portion, complete the alignment process, started when the battery and radio were pivotally attached at the other end. Dual pivotal supports are used to balance the alignment better. However, it is possible to implement the invention with only one pivotal support.

The protrusions 36 and 13 preferably carry cylindrical conductive contacts. These contacts are force-fitted into molded through-holes 112 and 114 of the battery housing 16 to integrally form the positive and negative charger contacts 21 and 18, charger sense contacts 19 and 20, and positive and negative battery supply contacts 28 and 26 in the housing.

The housing 16 and housing portion 22 can either be one integrated housing or two separate housings coupled together. Preferably, for attaching the two separate parts, battery cover 22 and battery housing 16 are ultrasonically welded together once battery cells 71, as seen in FIG. 4, have been placed inside a cell compartment housing 206 (and correspondingly covered with a cell compartment cover portion 106). A top extension 6 extends from the cell compartment cover portion 106 and forms the base of a releasable snap assembly 102 for latching on to the catch assembly 104 of the radio's backside or chassis 14.

Referring to FIGS. 2 and 4, snap assembly 102 includes a single latch and spring piece. The single latch and spring piece may be made from any suitable resilient material such as polycarbonate or any other type of plastic. In the preferred embodiment the single piece is molded as an integral part of the battery cover, but other implementations may be apparent to those skilled in the art.

The single latch and spring piece is molded at two "L" shaped support ends to the extension 6. As part of the single piece, two "S" shaped spring support arms each connect to the free end of the supports. A beam or sidewall 2 of the latch and spring piece joins the two spring support arms, in order to form a spring and minimize the stress on the spring.

Two latch protrusions, hooks, or snaps 52 and 54 are perpendicularly projected from the beam 2 and are used to lock the battery to the radio. Dual hooks provide more of a balanced locking assembly. However, it is possible to implement the invention with only one hook in accordance with the invention. The latch hooks 52 and 54 are preferably tapered on several surfaces, including a slope 421, for easier snapping action and slightly thickened near the center, between the two hooks, to protect the hooks from wear and tear.

The single latch piece 102 also includes a rigid ejector 4 perpendicularly and centrally mounted on the beam 2, around the hooks, to minimize bending of that center area. Preferably, the ejector 4 is a tri-pod having a center triangular support leg or rib 250 mounted between the two latch hooks 52 and 54. A side view, in FIG. 4, shows a "U" shaped retainer 422. This retainer 422 is formed from each of the bottom protruded surface of the latch hooks 52 intersecting the corner of the underside of the ejector 4 and the beam 2.

To provide an operator-selected ejecting feature, the common tip of the tripod ejector 4 forms a button 3. Controlled by the common button 3 connection, the hooks 52 and 54 parallel each other, as they move in the horizontal or inward direction 530. This parallel motion prevents bowing of the beam 2 and minimizes the required force or beam travel to disengage the hooks 52 and 54.

To expose a center hook area 302, the extension 6 is preferably cut-out in a "U" shape. The bottom of the "U" or the overall width of the extension 6 limits the travel of the beam 2 in the vertical or downward direction.

Referring to FIG. 4, a cut-away view of only the ejector 4 and snap latch 52 is shown in a simplistic battery and radio assembled representation. Opposite the cover extension 6, the front portion of the battery housing forms a housing over-travel limiting plastic skirt, detent, or protective sheath 122 that inhibits over-travel and damage of the button 3. Skirt 122 extends from the battery cell compartment portion 206 and intersects its inner wall 124. Inner wall 124 and the skirt 122 form a cavity 113 to receive the single latch piece and to control its travel from being twisted in any direction, even when the battery pack is removed from the protection of the radio housing 16. Specifically, inner wall 124 inhibits over-travel and damage of the beam 2 from being bent too far inward.

When the battery housing 16 and the battery cover 22 are suitably joined, button 3 slips through an opening 118 defined by a recessed edge 125 of the housing skirt 122. Since button 3 is omnidirectionally captured, except in the horizontal direction, by the recessed edge 125, in the front end, and the beam 2 is blocked by the inner wall 124 in the back end, the travel of the latch hooks 52 and 54 is restricted when the beam 2 carrying them is similarly restricted from moving beyond the plastic's yield limit in any direction.

As seen in FIG. 4, the overall shape of the single latch piece is arched or in whatever shape needed to fit the cavity 113. The back side 210 of the two side legs 252 and 254 of the tri-pod ejector 4 is also slightly curved or tapered to more easily fit the ejector 4 in the cavity portion 113. A cut relief or indented recess 126, around the opening 118, allows for easy depression of the button 3 with an operator's finger. Once the cover 22 is welded to the housing 16, the only exposed areas are then those of the button 3 and the hook area 302.

For attaching the battery of FIG. 2 to the radio of FIG. 1, the lower protrusions 36 of the lower end 44 of the battery are inserted and engaged by the corresponding radio apertures 64. Then the battery housing is pivoted toward its locked position. The slope 421 of each of the latch hooks 52 and 54 slide down the slope 321 of each of the fixed hooks 152 and 154 until the latch hooks lock or snap into place. The resilient plastic beam 2 decompresses the latch hooks into their "locked" positions when each of the fixed protrusions 15 are up and beyond the slopes 421. To maintain the latch hooks 52 and 54 in this latched position, the release of the beam's spring force biases the hooks 52 and 54, carried by the beam 2, toward the recessed wall 78 of the fixed hooks 152 and 154. When decompressed, the double spring beam 2 has sufficient tension from its double spring arms to provide spring force retention. That decompression release outwardly pushes the battery housing 10 toward the chassis 14, making retention easier. Meanwhile, the "U" shaped retainer 422 locks on to the protrusion 15. The tri-pod's center leg 250 also fits in between the two fixed hooks 152 and 154 of the radio chassis 34.

This latching at one end, opposite a pivoted end, forces the user to combine deliberate motions to prevent accidental battery detachment. To remove the battery, the user has to hold the radio stationary while grabbing and resting the palm against the battery. Meanwhile, the latch assembly 102 is deflected and the battery pack is pivoted upward while deflection is maintained.

When wishing to unlock the battery pack 10 from the radio 30, one would linearly deflect the outer button end 3 of the tri-pod ejector 4. As both of the latch hooks 52 and 54 are moved inward, by the commonly connected button 3, to release the battery 10, the ejector 4 springs or compresses the latch hooks 52 and 54 of the battery pack off or away from the radio. The rigid plastic ejector piece 4 moves the beam 2 and subsequently also the hooks 52 and 54 carried with the beam 2 away from the radio's fixed hooks 152 and 154.

To facilitate button deflection, the area surrounding the opening 118 and the recessed edge 125 forms a finger indented recess 126 on the skirt 122. This finger indented recess 126 thus allow easy latch removal access from the outside of the battery housing 16. At the same time, access is purposely designed to be very limited on the inside of the battery housing 16 by creating a tight fit for the cavity 113.

In summary, only two piece parts, the battery cover and the battery housing, are used to house, cover, and protect a resilient latch. Thus, a battery pack latch is provided which facilitates insertion of the battery pack on to and removal from a radio housing, while preventing accidental removal.

What is claimed is:

1. A battery pack for use with a radio, said radio having a backside including a battery receiving area, a bottom sidewall extending perpendicularly from said backside and having a plurality of apertures formed therethrough, a cavity disposed on said battery receiving area having a plurality of contacts disposed therein, and a catch assembly, said battery pack comprising:

a battery latch, comprising:

a button extending through an opening having a finger recess;

a plurality of hooks for engaging said catch assembly; and an ejector for releasing said hooks from said catch assembly upon said button being selectively depressed by an operator;

a plurality of bosses formed on a bottom side of said battery pack, each of said bosses having at least one contact and adapted to extend into one of said apertures, thereby exposing said at least one contact, said plurality of bosses providing a, pivot support for latching said battery pack to said radio;

a boss formed on a battery cover corresponding with said cavity for aligning said battery pack with said radio, said boss formed on said battery cover including contacts corresponding with said contacts disposed in said cavity; and at least one battery cell connected to at least one of said contacts.

2. A battery pack as defined by claim 1, wherein said battery latch further comprises a center rib.

3. A battery pack as defined by claim 1, wherein said battery latch hooks have a sloping portion which act on a similar sloping top surface of said catch assembly adapted to deflect said battery latch upon latching said battery pack to said radio.

\* \* \* \* \*